United States Patent [19]

Kuo et al.

[11] Patent Number: 6,064,865
[45] Date of Patent: May 16, 2000

[54] PROPORTIONAL DIVERSITY RADIO RECEIVER SYSTEM WITH DYNAMIC NOISE-CONTROLLED ANTENNA PHASERS

[75] Inventors: Yao Hsien Kuo, West Bloomfield; John Francis Kennedy, Dearborn, both of Mich.; Milan Cvetkovic, Rochester; Christopher Stanley Nicholas, Bushey, both of United Kingdom

[73] Assignee: Ford Motor Company, Dearborn, Mich.

[21] Appl. No.: 09/260,326

[22] Filed: Mar. 1, 1999

[51] Int. Cl.[7] .................................................. H04B 17/02
[52] U.S. Cl. ...................... 455/135; 455/137; 455/278.1; 455/303
[58] Field of Search ..................................... 455/131, 132, 455/133, 134, 135, 136, 137, 272, 273, 276.1, 277.1, 277.2, 278.1, 296, 303, 307

[56] References Cited

U.S. PATENT DOCUMENTS

| | | |
|---|---|---|
| 4,512,034 | 4/1985 | Greenstein et al. . |
| 4,710,975 | 12/1987 | Okamoto et al. . |
| 4,850,037 | 7/1989 | Bochmann . |
| 4,939,791 | 7/1990 | Bochmann et al. . |
| 5,203,029 | 4/1993 | Betzl et al. . |
| 5,339,452 | 8/1994 | Sugawara . |
| 5,603,107 | 2/1997 | Gottfried et al. . |
| 5,608,409 | 3/1997 | Rilling . |
| 5,680,142 | 10/1997 | Smith et al. . |
| 5,875,216 | 2/1999 | Martin ...................................... 455/137 |

FOREIGN PATENT DOCUMENTS 2-257-605  1/1993  United Kingdom .

OTHER PUBLICATIONS

Phased Arrays, Tang, et al., Hughes Aircraft Company, pp. 20–1 to 20–67.

*Primary Examiner*—Reinhard J. Eisenzopf
*Assistant Examiner*—Sam Bhattacharya
*Attorney, Agent, or Firm*—Mark Mollon

[57] ABSTRACT

A space diversity, multiple-tuner radio receiver obtains substantially noise free reception under most signal conditions. The tuner outputs are mixed in proportion with the signal quality as determined by detecting noise in each tuner output signal. Long-time-delay multipath distortion, adjacent channel interference, and co-channel interference are reduced by selecting predetermined antenna pattern combinations in response to high noise levels being present from both tuners.

10 Claims, 3 Drawing Sheets

ANTENNA 1

ANTENNA 2

PROPORTIONAL DIVERSITY RADIO RECEIVER SYSTEM WITH DYNAMIC NOISE-CONTROLLED ANTENNA PHASERS

BACKGROUND OF THE INVENTION

The present invention relates in general to space diversity radio receivers with spaced antennas, and, more specifically, to a diversity radio receiver system with proportional mixing of output signals from multiple tuners which are attached to a reconfigurable antenna signal combiner that combines antenna signals according to different phase combinations.

Space diversity radio receiver systems are a well-known means to reduce the effects of multipath distortion in mobile receivers. Multipath distortion is a localized effect resulting from interaction between signals from a transmitter which traverse different paths to reach a receiving antenna. By switching between spaced antennas in a diversity radio receiver, specific multipath events can be avoided since the spacing of the antennas helps insure that not both of the antennas will experience the same "short time delay" multipath events at the same time.

Co-pending application U.S. 09/103,131, entitled "Proportional Diversity Radio Receiver System," filed Jun. 23, 1998, which is incorporated herein by reference, discloses a proportional mixing system for reducing both short time delay multipath and long time delay multipath distortion mixing first and second tuner output signals proportionally in response to their signal strength signals and their detected long time delay multipath distortion. Such a proportional mixer, however, may still produce a noisy output signal when the antenna signals at both antennas are poor.

Since any particular broadcast could be received using either antenna at any particular time, each antenna in a mobile diversity system is designed to provide omni-directional reception. Thus, any noise present in the received signals which resulting from non-multipath sources, such as adjacent channel and co-channel interference and weak signal conditions, are present equally in both antennas and they cannot be removed by proportional mixing.

SUMMARY OF THE INVENTION

The present invention has the advantage that overall reception performance of a mobile receiver is improved even in the presence of short-delay and long-delay multipath, adjacent channel and co-channel interference, and weak signal reception. The proportional diversity system with noise-controlled antenna phasers is much simpler and less expensive than full adaptive antenna array systems as known in the prior art.

In one aspect, the invention provides a multituner, space diversity radio receiver comprising a first tuner providing a first tuner output signal and a second tuner providing a second tuner output signal. A first antenna provides a first antenna signal and a second antenna provides a second antenna signal to an antenna signal combiner which selectively combines the first and second antenna signals according to a selected one of a plurality of predetermined phase combinations. A first noise detector is coupled to the first tuner and produces a first noise level signal in response to a level of noise detected in the first tuner output signal. A second noise detector is coupled to the second tuner and produces a second noise level signal in response to a level of noise detected in the second tuner output signals. A tuner signal combiner is coupled to the first and second tuners and to the first and second noise detectors for combining the first and second tuner output signals into a mixed tuner output signal in proportion to the first and second noise level signals respectively. A noise threshold detector is coupled to the first and second noise detectors and generates an excessive noise detection signal if both of the first and second noise signals are greater than a predetermined threshold. A control is coupled to the noise threshold detector and the antenna signal combiner to select a different one of the predetermined phase combinations in response to the excessive noise detection signal.

DETAILED DESCRIPTION OF PREFERRED EMBODIMENTS

Figure 1:
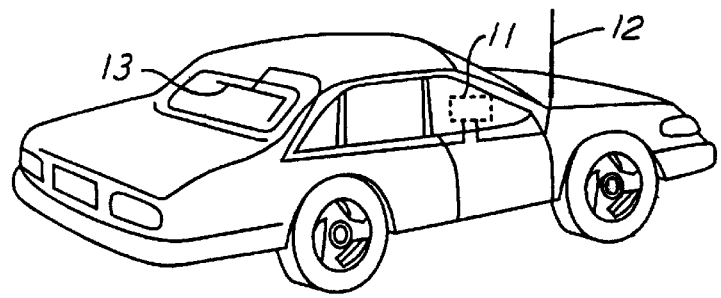
FIG. 1 is a perspective view of a mobile vehicle having space diversity antennas mounted thereon.

Referring to FIG. 1, a mobile vehicle 10 includes a proportional diversity radio receiver 11 connected to a pair of antennas 12 and 13 in a dual tuner proportional diversity radio system. Antenna 12 is shown as a vertical whip or mast antenna while antenna 13 is shown as an on-glass comformal antenna. The antennas are connected to receiver 11 via appropriate transmission lines. Mounting one antenna near the front of the vehicle and the other antenna near the rear of the vehicle maximizes their spacing distance and provides the greatest ability to minimize multipath events. Although the spaced diversity antennas need not have identical electrical and reception properties, each is preferably designed to provide acceptable reception equally from all directions and expected signal polarizations.

Figure 2:
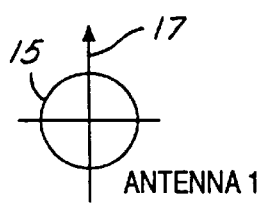
FIG. 2 is a plot showing antenna patterns for first and second diversity antennas.
Figure 2:
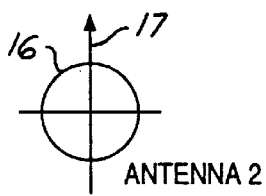

As shown in FIG. 2, each antenna acting alone preferably provides a substantially omni-directional radiation pattern since it is desired to maintain the ability to receive broadcast signals from any direction from either antenna whenever the antenna signals themselves are not being combined using phasers. More specifically, FIG. 2 shows unmodified antenna patterns including a first pattern 15 for the first antenna and a pattern 16 for the second antenna, each pattern being substantially omni-directional with respect to a predetermined direction 17 such as the forward direction of the vehicle. Thus, the first antenna signal and the second antenna signal can be coupled to first and second tuners, respectively, for omni-directional reception.

The present invention recognizes the possibility that long-time delay multipath distortion or adjacent channel or co-channel interference or generally weak signal conditions can occur making acceptable reception impossible using only omni-directional antenna patterns. Therefore, the present invention detects times when neither tuner provides an acceptable reception signal and then modifies antenna reception patterns by combining signals from the two separate antennas. Preferably, these directional antenna patterns are aligned toward the front, back, and sides of the vehicle as described in copending application Ser. No. (198-0014), incorporated herein by reference.

Figure 3:
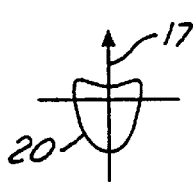
FIG. 3 plots a pair of effective antenna patterns resulting from a particular phase combination of antenna signals.
Figure 3:
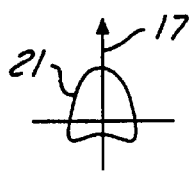
Figure 4:
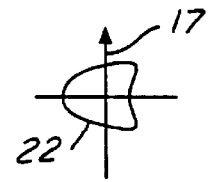
FIG. 4 plots another pair of effective antenna patterns resulting from a different phase combination of antenna signals.
Figure 4:
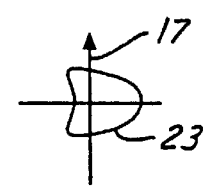

The two tuners may be driven from the antennas with different antenna reception patters as shown in FIGS. 3 and 4. The first and second antennas are interconnected according to various phase shifting and weighting of signals in order to produce directional antenna signals so that the respective tuners become sensitive in opposite directions during poor signal reception. Thus, a first tuner may receive an antenna signal according to an antenna pattern 20 providing directional antenna reception in a direction opposite from direction 17 while the other tuner receives an antenna signal corresponding to an antenna pattern 21 having greatest signal reception in the same direction as direction 21, as shown in FIG. 3. When the antenna patterns of FIG. 3 fail to improve reception, then antenna patterns 22 and 23 of FIG. 4, which are perpendicular to direction 17, may be tried. By alternating between antenna pattern pairs as shown in FIGS. 2–4, the multi-tuner space-diversity radio receiver of the present invention can find an antenna pattern which provides the best possible reception during conditions of generally poor signal reception. In other words, the tuner input is desensitized with respect to sources of multipath interference and adjacent channel interference which are received from a different direction than the direct broadcast signal.

Figure 5:
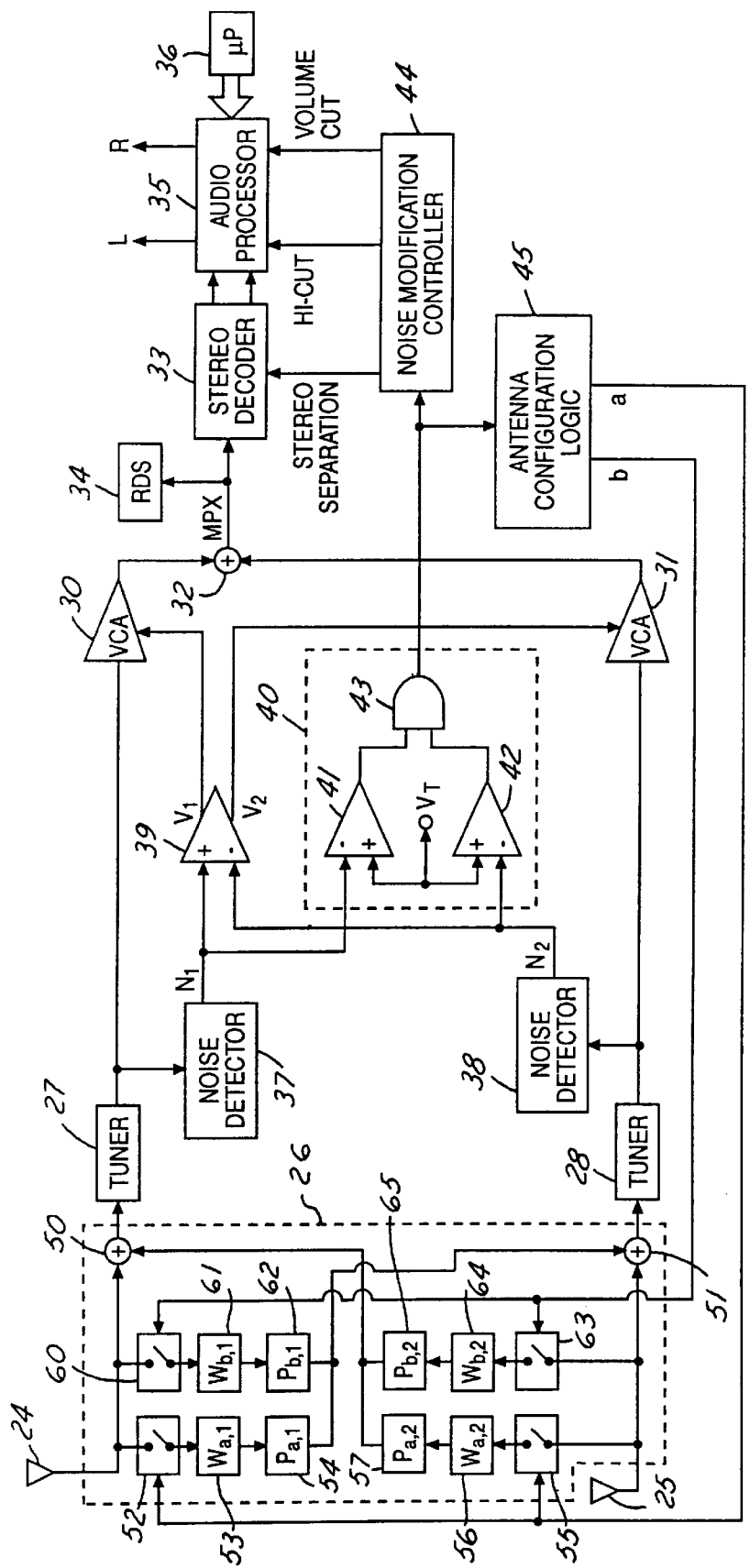
FIG. 5 is a block diagram showing a radio receiver according to the present invention.

A preferred embodiment of an FM receiver of the present invention is shown in greater detail in FIG. 5. First and second antennas 24 and 25 are coupled through an antenna signal combiner 26 to first and second tuners 27 and 28, respectively. The output signals from tuners 27 and 28 are coupled through voltage controlled amplifiers (VCA) 30 and 31, respectively, to inputs of a summer 32. In an FM receiver, a mixed tuner output signal MPX from summer 32 is provided to the input of a stereo decoder 33 and to a radio data system (RDS) decoder 34. Left and right stereo audio signals are provided from stereo decoder 33 to an audio processor 35 which is under control of a microprocessor 36 for adjusting audio parameters such as volume, tone, balance, and fade. The mixed tuner output signal from summer 32 is obtained in accordance with the detected noise level of each respective tuner signal. Thus, a noise detector 37 is coupled to receive the output signal from tuner 27 and provides a detected noise signal $N_1$ to the non-inverting input of a common mode amplifier 39. Similarly, a noise detector 38 generates a noise level signal $N_2$ in response to the output from tuner 28. Noise level signal $N_2$ is coupled to the inverting input of common mode amplifier 39. Amplifier 39 provides a first control voltage $V_1$ to a control input of VCA 30 and a control voltage $V_2$ to a control input of VCA 31.

Figure 6:
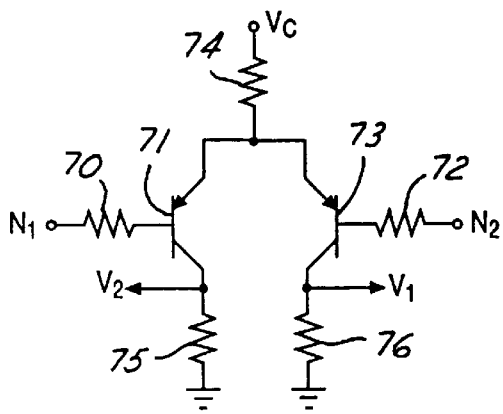
FIG. 6 is a schematic diagram showing a common mode amplifier as employed in FIG. 5.

Common mode amplifier 39 is shown in greater detail in FIG. 6. Noise level signal $N_1$ is coupled through a resistor 70 to the base terminal of a transistor 71. Noise level signal $N_2$ is coupled through a resistor 72 to the base terminal of a transistor 73. The emitter terminals of transistors 71 and 73 are tied together and coupled to a voltage supply $V_c$ through a resistor 74. The collector terminals of transistors 71 and 73 are coupled to ground through resistors 75 and 76, respectively. The collector terminal of transistor 71 outputs control voltage $V_2$ while the collector terminal of transistor 73 outputs control voltage $V_1$. Control voltages $V_1$ and $V_2$ are complementary in that they provide a substantially constant sum such that the mixed FM MPX signal from summer 32 has a constant output level with no audio modulation. Thus, the output signals from tuners 27 and 28 are combined in proportion to the magnitude of noise detected by each respective noise detector. Noise detectors 37 and 38 may detect the magnitude of noise by examining high frequency components of the tuner output signals as is described in U.S. Pat. No. 5,125,105, which is incorporated herein by reference.

In the case that excessive noise is detected within the output simultaneously from each tuner, then proportional mixing of the two tuner signals fails to produce an acceptable reception signal. Thus, the present invention employs a noise threshold detector 40 to detect the occurrence of excessive noise in both tuners simultaneously and to generate an excessive noise detection signal if both the first and second noise level signals $N_1$ and $N_2$ are greater than a predetermined threshold $V_t$. Noise threshold detector 40 includes a comparator 41 receiving noise level signal $N_1$ at its inverting input and receiving threshold voltage $V_t$ at its non-inverting input. A comparator 42 receives noise level signal $N_2$ at its inverting input and receives threshold voltage $V_t$ at its non-inverting input. The outputs of comparators 41 and 42 are coupled to respective inputs of an AND gate 43 which provides its output signal to a noise modification controller 44 and to an antenna configuration logic block 45. When the excessive noise detection signal from AND gate 43 is has a high level, noise modification controller 44 and antenna configuration logic block 45 are activated.

Noise modification controller 44 preferably employs several known corrective actions for reducing the affects of noise on audio reproduction including reducing stereo separation in the stereo decoder, reducing high frequency gain (i.e., hi-cut) in the audio output, and reducing total receiver volume (i.e., volume cut).

Figure 7:
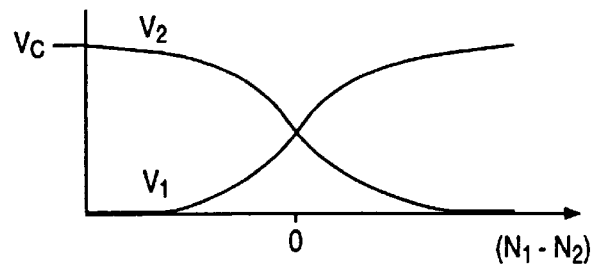
FIG. 7 is a plot showing output voltages from the common mode amplifier for various inputs to the amplifier for proportional mixing of the tuner signals.

The complementary voltage levels for control signals $V_1$ and $V_2$ are shown in FIG. 7. Each signal varies between minimum gain at zero volts and maximum gain at voltage $V_c$ in response to the difference between noise level signals $N_1$ and $N_2$.

Figure 8:
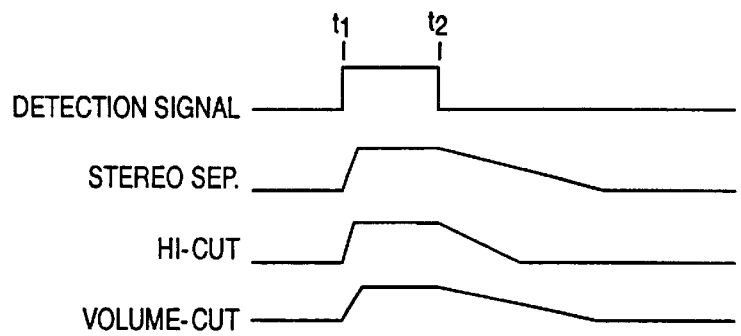
FIG. 8 shows control signals generated by the noise modification controller of FIG. 5.

FIG. 8 shows control voltages for implementing stereo separation reduction, hi-cut and volume-cut in response to an excessive noise detection signal extending between times $t_1$ and $t_2$. Each noise reduction action is implemented with a respective attack time as is known in the art to reduce distortion. After reaching maximum, each noise reduction action remains at its maximum until it is released at time $t_2$ when the excessive noise detection signal ceases. Each noise reduction action then decays at an appropriate rate as known in the prior art.

Returning to FIG. 5, when an excessive noise detection signal is present, the antenna configuration is changed in order to attempt to find a better reception signal using different antenna patterns. Thus, when the output from AND-gate 43 has a positive going transition, antenna configuration logic 45 increments to its next control state for configuring antenna combiner 26. When both outputs a and b from logic block 45 are low logic levels, then tuners 27 and 28 receive only from antennas 24 and 25 respectively without combination of antenna signals (this corresponds to omni-directional reception for both tuners). When either logic block output a or b is high, then antenna signals are cross-fed to shifting and weighting circuits and then added in summers 50 and 51 to generate the various directional antenna patterns. Thus, logic block output a is coupled to a switch 52 and a switch 55. Switch 52 is connected between antenna 24 and a first weighting block 53 which attenuates the antenna signal by a weight factor $W_{a,1}$. The weighted signal from weight block 53 is phase shifted in a phase shift block 54 according to a phase shift value $P_{a,1}$. The phase-shifted signal is coupled to one input of summer 51. Also in response to logic block output a, switch 55 selectively provides antenna signals from antenna 25 to a weight block 56 with a weighting factor $W_{a,2}$. This weighted signal is provided through a phase shift block 57 with a phase shift value Pa, 2 to one input of summer 50. With output a from logic block 45 high, the phase shifting and weighting circuits provide effective antenna patterns to tuners 27 and 28 corresponding to the antenna patterns shown in FIG. 3, for example.

When output b of logic block 45 is high, then switches 60 and 63 are activated which results in the effective antenna patterns of FIG. 4 being provided to tuners 27 and 28.

The phase shift and weighting factors used in antenna combiner 26 depend upon the specific antenna configurations and properties, as well as the electromagnetic properties of the vehicle in which they are installed. The determination of actual values for any particular receiver and vehicle can be accomplished using techniques well known in the art for obtaining desired antenna reception patterns. A weighting circuit may employ resistive attenuators while the phase shift circuits may be comprised of inductive and/or capacitive circuits. Outputs a and b of logic block 45 are mutually exclusive in that only one can be at a high level at any time although both can be a low level (i.e., when omni-directional antenna patterns are being used).

Figure 9:
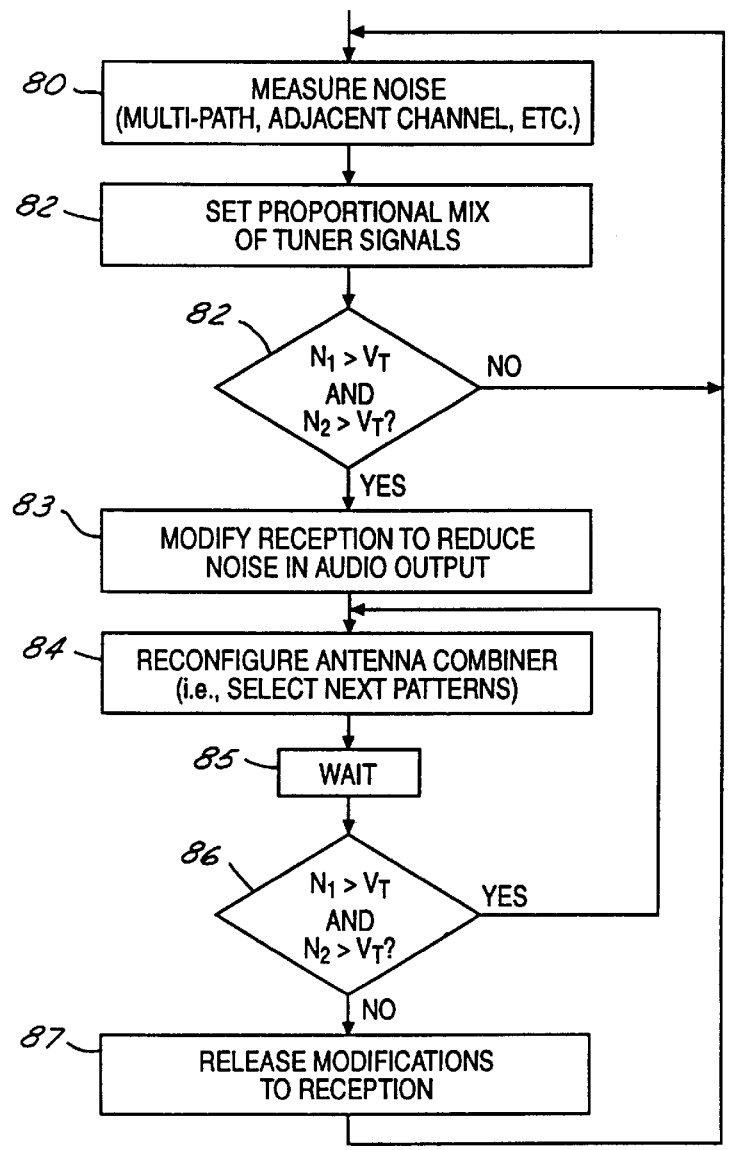
FIG. 9 is a flowchart showing a preferred embodiment of the method of the present invention.

Operation of the receiver of FIG. 5 will be described in greater detail in connection with the flowchart of FIG. 9. In step 80, the noise level in each tuner output signal is measured using the noise detectors in order to detect the occurrence of multipath, adjacent channel interference, and other types of interference. In step 81, the common mode amplifier sets the proportional mixing amount of each tuner output signal into a final mixed output signal for reproduction by the receiver. The noise level signals $N_1$ and $N_2$ are compared with predetermined noise threshold $V_t$ in step 82. If noise level signals $N_1$ and $N_2$ are not both above the predetermined threshold, then a return is made to step 80 for further monitoring of noise level. If, however, both noise level signals $N_1$ and $N_2$ are above threshold $V_t$, then corrective action is taken beginning with step 83, wherein reception is modified to reduce noise in the audio output (i.e., reduction of stereo separation, hi-cut, and volume-cut). In step 84, the antenna combiner is reconfigured in order to select the next set of antenna patterns. The antenna configuration logic waits for a predetermined delay in step 85 to allow the receiver to settle into the new reception pattern. The predetermined delay is preferably equal to about 500 microseconds. In step 86, another check is made to determine whether both noise level signals $N_1$ and $N_2$ are still above the predetermined threshold. If both are above, then a return is made to step 84 for reconfiguring to the next antenna patterns. If both noise level signals are not above the threshold, then an acceptable reception pattern has been found and the antenna combiner is left in its current state. The modifications to the reception from step 83 are released in step 87 and a return is made to step 80 for further monitoring of the noise level.

What is claimed is:

1. A multi-tuner, space diversity radio receiver comprising:

a first tuner providing a first tuner output signal;

a second tuner providing a second tuner output signal;

a first antenna providing a first antenna signal;

a second antenna providing a second antenna signal;

an antenna signal combiner coupled between said antennas and said tuners selectably combining said first and second antenna signals according to a selected one of a plurality of predetermined phase combinations;

a first noise detector coupled to said first tuner and producing a first noise level signal in response to a level of noise detected in said first tuner output signal;

a second noise detector coupled to said second tuner and producing a second noise level signal in response to a level of noise detected in said second tuner output signal;

a tuner signal combiner coupled to said first and second tuners and said first and second noise detectors combining said first and second tuner output signals into a mixed tuner output signal in proportion to said first and second noise level signals, respectively;

a noise threshold detector coupled to said first and second noise detectors and generating an excessive noise detection signal if both of said first and second noise level signals are greater than a predetermined threshold; and a controlling coupled to said noise threshold detector and said antenna signal combiner to select a different one of said predetermined phase combinations in response to said excessive noise detection signal.

2. The radio receiver of claim 1 wherein at least one of said predetermined phase combinations creates a directional null in a radiation pattern of one of said antennas.

3. The radio receiver of claim 1 wherein said predetermined phase combinations create pairs of directional nulls in radiation patterns of said first and second antennas.

4. The radio receiver of claim 1 wherein said antenna signal combiner includes switched weighting and phase delay circuits.

5. The radio receiver of claim 4 wherein said antenna signal combiner further includes a configuration for passing only said first antenna signal to said first tuner and only said second antenna signal to said second tuner.

6. A method of controlling an antenna signal combiner in a space diversity radio receiver having first and second antennas and first and second tuners, wherein said antenna combiner includes switched weighting and phase delay circuits for selectably combining first and second antenna signals to be applied to said first and second tuners according to a plurality of respective predetermined directional radiation patterns, said method comprising the steps of:

measuring first and second noise magnitudes in output signals from said first and second tuners, respectively;

proportionally combining said output signals from said first and second tuners in response to said first and second noise magnitudes to provide a mixed tuner output signal for recovering broadcast information;

comparing said first and second noise magnitudes to a predetermined noise threshold and generating a detection signal if both of said noise magnitudes are greater than said predetermined noise threshold; and reconfiguring said antenna combiner in response to an initial generation of said detection signal in order to select different respective predetermined directional radiation patterns.

7. The method of claim 6 further comprising the steps of:

waiting for a predetermined settling time after reconfiguring said antenna combiner; and again reconfiguring said antenna combiner if said detection signal is still present in order to select different respective predetermined directional radiation patterns.

8. The method of claim 6 further comprising the step of:

modifying reproduction of said mixed tuner output signal in response to said detection signal in order to reduce effects of noise on said recovery of broadcast information.

9. The method of claim 6 wherein said antenna combiner includes configurations providing predetermined directional radiation patterns comprised of:

a first null in a first direction for said first tuner simultaneously with a second null about 180° from said first null for said second tuner; and a third null about 90° from said first direction for said first tuner simultaneously with a fourth null about 180° from said third null for said second tuner.

10. The method of claim 9 wherein said antenna combiner includes a configuration providing a predetermined direction radiation pattern in which said first tuner receives only from said first antenna and said second tuner receives only from said second antenna.

* * * * *